(12) United States Patent
Kim et al.

(10) Patent No.: US 11,538,350 B2
(45) Date of Patent: Dec. 27, 2022

(54) SERVICE ROBOT AND METHOD FOR OPERATING THEREOF

(71) Applicants: Hyundai Motor Company, Seoul (KR); Kia Motors Corporation, Seoul (KR)

(72) Inventors: Kye Yoon Kim, Gunpo-si (KR); Ji Min Han, Seoul (KR); Ji A Lee, Uiwang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 839 days.

(21) Appl. No.: 16/507,368

(22) Filed: Jul. 10, 2019

(65) Prior Publication Data
US 2020/0152073 A1 May 14, 2020

(30) Foreign Application Priority Data
Nov. 8, 2018 (KR) .......................... 10-2018-0136707

(51) Int. Cl.
*G09B 5/02* (2006.01)
*G06T 7/73* (2017.01)
(Continued)

(52) U.S. Cl.
CPC .............. *G09B 5/02* (2013.01); *B25J 9/1697* (2013.01); *B25J 13/08* (2013.01); *G06F 3/011* (2013.01);
(Continued)

(58) Field of Classification Search
CPC ... G09B 5/02; G06T 7/74; G06T 2207/30252; H04W 4/80; B25J 9/1697; B25J 13/08; G06F 3/011; G06F 3/167; H04N 9/3141
(Continued)

(56) References Cited

U.S. PATENT DOCUMENTS

| 8,438,695 B2 * | 5/2013 | Gilbert, Jr. ............. A47L 9/0488 |
| | | 15/319 |
| 9,138,891 B2 * | 9/2015 | Herzog ................ G05D 1/0246 |

(Continued)

FOREIGN PATENT DOCUMENTS

| CN | 106406119 A * | 2/2017 | ............. G05B 15/02 |
| KR | 10-2014-0118637 A | 10/2014 | |
| WO | WO-2017073955 A1 * | 5/2017 | ............ A47L 11/185 |

OTHER PUBLICATIONS

Kentaro et al., "Active Navigation Landmarks for a Service Robot in a Home Environment," 2010, Publisher: IEEE.*
(Continued)

*Primary Examiner* — Tuan C To
(74) *Attorney, Agent, or Firm* — Morgan, Lewis & Bockius LLP (57) ABSTRACT

A service robot for guiding and describing a displayed vehicle and a method for operating the robot, may include a projector for projecting visual information related to a target vehicle; monitoring means for monitoring a state of a user; and a controller configured to: suggest, to the user, presentation of visual information in conjunction with a guide description of the target vehicle; determine, via the monitoring means, whether the user has accepted the suggestion; and upon determination that the user has accepted the suggestion, present the visual information via the projector.

20 Claims, 9 Drawing Sheets

(51) Int. Cl.
*G06F 3/16* (2006.01)
*G06F 3/01* (2006.01)
*H04W 4/80* (2018.01)
*B25J 9/16* (2006.01)
*B25J 13/08* (2006.01)
*H04N 9/31* (2006.01)

(52) U.S. Cl.
CPC ............... *G06F 3/167* (2013.01); *G06T 7/74* (2017.01); *H04N 9/3141* (2013.01); *H04W 4/80* (2018.02); *G06T 2207/30252* (2013.01)

(58) Field of Classification Search
USPC ........................................................ 700/259
See application file for complete search history.

(56) References Cited

U.S. PATENT DOCUMENTS

| | | | | |
|---|---|---|---|---|
| 9,717,387 | B1* | 8/2017 | Szatmary | A47L 9/2805 |
| 10,065,314 | B2* | 9/2018 | Tian | G05D 1/0214 |
| 11,100,384 | B2* | 8/2021 | Finkelstein | G06N 5/04 |
| 11,204,787 | B2* | 12/2021 | Radebaugh | G06F 3/167 |
| 11,218,429 | B2* | 1/2022 | Yun | G06F 40/205 |
| 2017/0326724 | A1* | 11/2017 | Wei | B25J 5/007 |
| 2018/0326593 | A1* | 11/2018 | Yoshiuchi | B25J 9/162 |
| 2020/0050211 | A1* | 2/2020 | Donnelly | B60H 1/00271 |
| 2020/0051001 | A1* | 2/2020 | Donnelly | G01C 21/3438 |
| 2020/0051194 | A1* | 2/2020 | Park | G06Q 50/28 |
| 2021/0026593 | A1* | 1/2021 | Wang | G06F 3/167 |

OTHER PUBLICATIONS

C. Balaguer et al., "Live experimentation of the service robot applications for elderly people care in home environments," 2005, Publisher: IEEE.*

* cited by examiner

SERVICE ROBOT AND METHOD FOR OPERATING THEREOF

CROSS-REFERENCE TO RELATED APPLICATION

The present application claims priority to Korean Patent Application No. 10-2018-0136707, filed on Nov. 8, 2018, the entire contents of which is incorporated herein for all purposes by this reference.

BACKGROUND OF THE INVENTION

Field of the Invention

The present invention relates to a service robot for guiding and describing a displayed vehicle and a method for operating the robot.

Description of Related Art

Generally, when a user desires to purchase a vehicle, the user may visit a vehicle exhibition site, such as a vehicle sales agency or a motor studio, to check information related to a vehicle desired to be purchased. When the user checks the vehicle information in the present way, it is difficult for the user to accurately grasp the vehicle performance and function in the actual driving environment of the vehicle. Therefore, conventionally, the user cannot determine whether or not the user is suitable for the vehicle and the driving environment.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a service robot for presenting visual information when guiding and describing a displayed vehicle and a method for operating the robot.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a service robot may include a projector for projecting visual information related to a target vehicle; monitoring means for monitoring a state of a user; and a controller configured to: suggest, to the user, presentation of the visual information during guide description of the target vehicle; determine, via the monitoring means, whether the user has accepted the suggestion; and upon determination that the user has accepted the suggestion, present the visual information via the projector.

In an exemplary embodiment of the present invention, the monitoring means may include: a sensor for detecting the user located within a predetermined radius from the target vehicle; and a processor for analyzing data detected at an output from the sensor and determining the state of the user.

In an exemplary embodiment of the present invention, the sensor may include at least one of a camera and a microphone.

In an exemplary embodiment of the present invention, the robot may further include: a sensor system for detecting positions of the target vehicle and the service robot; and a communication module for performing wireless communication with the target vehicle.

In an exemplary embodiment of the present invention, the controller is further configured to: acquire identification information related to the target vehicle through the communication module; and recognize the target vehicle based on the identification information.

In an exemplary embodiment of the present invention, the controller is further configured to: determine the positions of the target vehicle and the service robot using the sensor system; and align a center portion of the service robot in a straight line with a center portion of the target vehicle.

In an exemplary embodiment of the present invention, the controller is further configured to: determine a presentation position of the visual information with reference to pre-stored information indicating an appropriate presentation position corresponding to each vehicle section; and move the service robot to the determined presentation position.

In an exemplary embodiment of the present invention, the controller is further configured to recognize a position onto which the projector may project the visual information.

In an exemplary embodiment of the present invention, the controller is further configured to: acquire an image of the target vehicle and compare the acquired image with a pre-stored reference image; and determine, based on the comparison result, whether an adjustment of the position of the service robot is required.

In an exemplary embodiment of the present invention, the controller is further configured to: when a similarity between the acquired image and the reference image is lower than a threshold value, adjust the position of the service robot based on pre-stored vehicle silhouette information.

According to various aspects of the present invention, a method for operating a service robot may include performing a guide description for a target vehicle; suggesting, to a user, presentation of a visual information service; determining whether the user accepts the suggestion; and upon determination that the user accepts the suggestion, presenting the visual information.

In an exemplary embodiment of the present invention, the performing of the guide description may include: recognizing the target vehicle; and presenting a function and a manipulation of the target vehicle.

In an exemplary embodiment of the present invention, the recognizing of the target vehicle may include recognizing tag information attached to the target vehicle using short-range wireless communication.

In an exemplary embodiment of the present invention, the suggesting of the presentation of the visual information may include: determining whether an additional description is contained in content of the guide description; and upon determination that the additional description is contained in the content, suggesting the presentation of the visual information to the user.

In an exemplary embodiment of the present invention, the additional description is presented visually.

In an exemplary embodiment of the present invention, determining whether the user accepts the suggestion may include recognizing a voice of the user input through a microphone and determining, based on the voice, whether the user accepts the suggestion.

In an exemplary embodiment of the present invention, determining whether the user accepts the suggestion may include monitoring a state of the user using a camera and determining, based on the state of the user, whether the user accepts the suggestion.

In an exemplary embodiment of the present invention, the presentation of the visual information may include: aligning a position of the service robot to the target vehicle; and when the aligning of the position of the service robot to the target vehicle is completed, projecting the visual information.

In an exemplary embodiment of the present invention, the aligning of the position of the service robot may include: determining a current position of the service robot; determining a presentation position for the visual information; moving the service robot to the determined presentation position; and recognizing a position on which the visual information may be projected.

In an exemplary embodiment of the present invention, the aligning of the position of the service robot may include: determining a presentation position for the visual information; moving the service robot to the determined presentation position; capturing an image of the target vehicle; comparing the captured image with a reference image; determining, based on a result of the comparison, whether a position of the service robot needs to be adjusted; and upon determination that the position of the service robot needs to be adjusted, adjusting the position of the service robot.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to an exemplary embodiment of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

As used herein, a service robot refers to a docent robot that guides visitors to vehicles displayed at a vehicle sales agency or a motor studio, and describes functions and operating methods for the displayed vehicles using voice.

Figure 1:
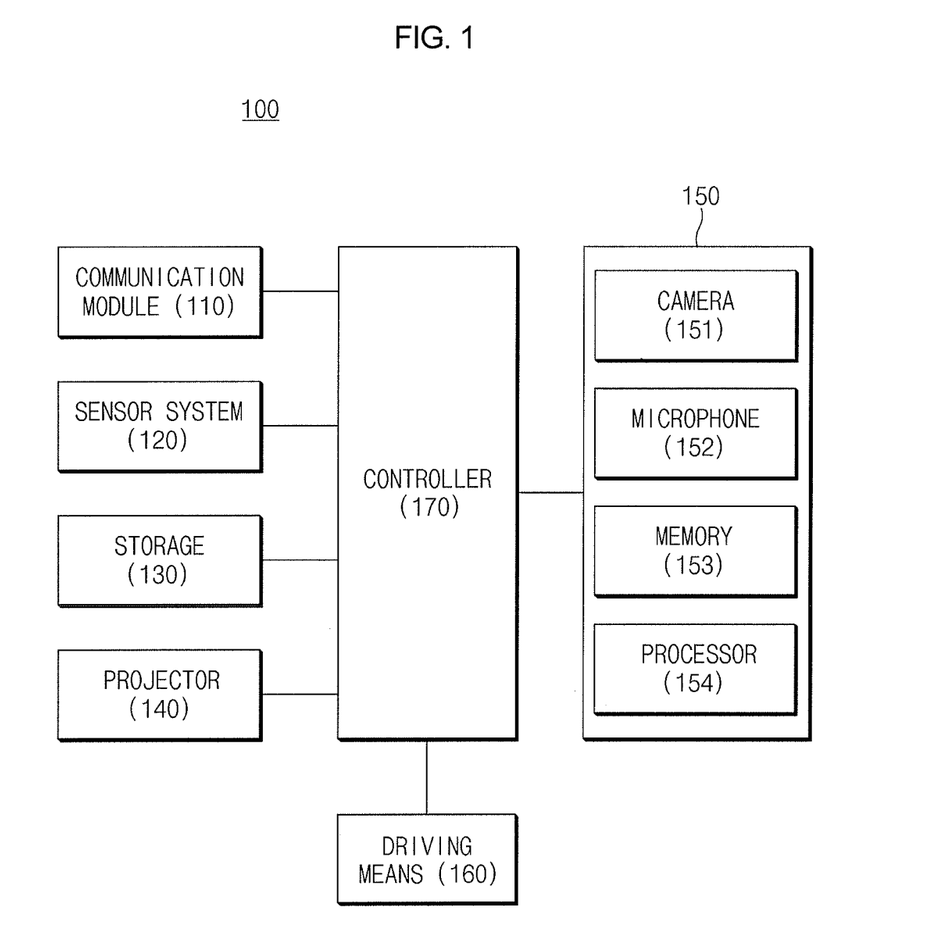
FIG. 1 is a block diagram showing a service robot according to an exemplary embodiment of the present invention.
Figure 2:
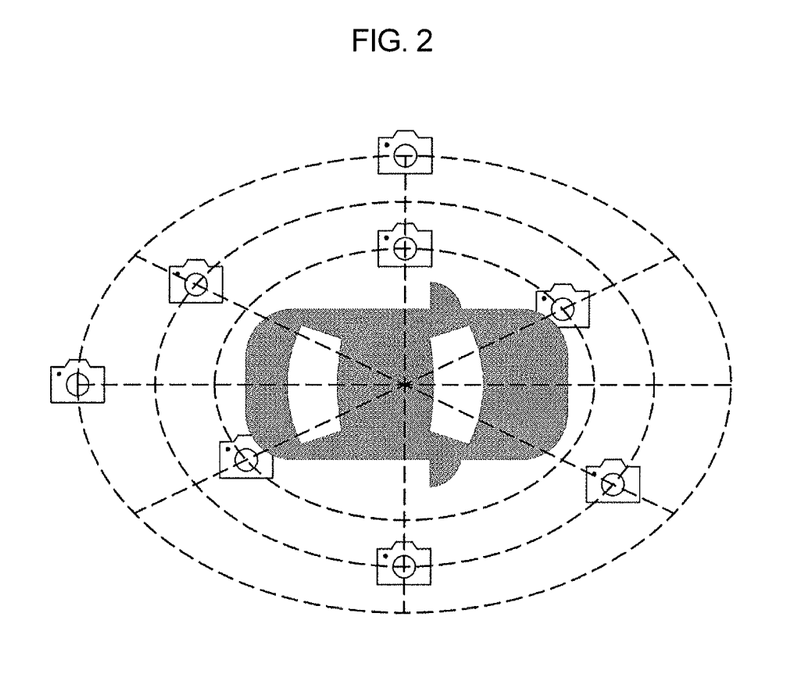
FIG. 2 is a diagram for describing vehicle section-based information related to the present invention.

FIG. 1 is a block diagram showing a service robot according to an exemplary embodiment of the present invention. FIG. 2 is a diagram for describing vehicle section-based information related to the present invention.

Referring to FIG. 1, a service robot 100 includes a communication module 110, a sensor system 120, storage 130, a projector 140, monitoring means 150, driving means 160, and a controller 170.

The communication module 110 exchanges data with an electronic device (e.g., an electronic tag, a vehicle terminal, a smart phone, and a server) connected to a wireless communication network. The communication module may be a transceiver which can transmit and receive information using an antenna. The communication module 110 may include a wireless Internet module for wireless Internet access and/or a short-range wireless communication module for short-range communication. The wireless communication technology may include wireless Internet technology such as WLAN (Wireless LAN) (WiFi), Wibro (Wireless broadband) and Wimax (World Interoperability for Microwave Access) and/or short-range communication technologies such as Bluetooth, Near Field Communication (NFC), Radio Frequency Identification (RFID), infrared data association (IrDA), Ultra Wideband (UWB), and ZigBee.

The communication module 110 receives identification information transmitted from each displayed vehicle. For example, the communication module 110 receives tag information transmitted from an electronic tag attached to a to-be-described vehicle (hereinafter referred to as "target vehicle"). In the present connection, the tag information may include identification information (e.g., vehicle number, vehicle type, and vehicle model) of the target vehicle.

The sensor system 120 detects surrounding objects around the service robot 100 and measures current positions of the service robot 100 and surrounding objects. Furthermore, the sensor system 120 acquires visual information, auditory information, and tactile information related to surroundings around the service robot. The sensor system 120 may include a distance sensor, an inertial sensor, an active beacon sensor, an image sensor, a tactile sensor, and an auditory sensor.

The distance sensor measures a distance between the service robot 100 and the target vehicle. The distance sensor may be implemented as at least one of sensors such as a radar (Radio Detecting And Ranging) and an ultrasonic sensor.

The inertial sensor measures an acceleration and angular velocity when the service robot 100 moves. The inertial may include an angular velocity sensor and an acceleration sensor. The acceleration and angular velocity measured by the inertial sensor are used to recognize a position and posture of the service robot 100.

The active beacon sensor is a sensor used to estimate the position of the service robot 100 together with the inertial sensor. The active beacon sensor is mainly used to estimate positions of the service robot 100 and the target vehicle interiors. The active beacon sensor may estimate the position of the service robot 100 or the target vehicle by emitting a ultrasonic wave and then determining a return time of the ultrasonic wave. Such an active beacon sensor and an inertial sensor may be collectively referred to as a position estimation sensor.

The image sensor acquires an image of a surrounding around the service robot 100 or an image of the target vehicle. The image sensor may be embodied as at least one of a charge coupled device (CCD) image sensor, a complementary metal oxide semi-conductor (CMOS) image sensor, a charge priming device (CPD) image sensor, and a charge injection device (CID) image sensor.

The tactile sensor allows the service robot 100 to detect a tactile and recognizes external tactile stimuli. The tactile sensor may include a touch sensor, a pressure sensor, and/or a force sensor.

The auditory sensor detects an acoustic signal generated from an outside. As the auditory sensor, a microphone (sound sensor) may be used.

The storage 130 stores information such as vehicle specification information, vehicle silhouette information, appropriate projection position information for each vehicle section, and projected vehicle information for each vehicle model in a database form. The vehicle silhouette information includes lengths of front, rear and both side sections of the vehicle, and tires positions. Vehicle section-based information includes images taken at 8-directions and 3-step distances from a center portion of the vehicle as shown in FIG. 2. For each image, a position of the vehicle section is tagged and stored.

Furthermore, the storage 130 stores a lane width and parking lot reference information pursuant to the Road Traffic Act. The storage 130 may store robot control algorithms, position estimation algorithms, image processing algorithms, and image comparison algorithms.

The storage 130 may be embodied as at least one of at least one storage (recording) medium including a flash memory, a hard disk, a Secure Digital (SD) card, a random access memory (RAM), a static random access memory (SRAM), a read only memory (ROM), a Programmable Read Only Memory (PROM), an Electrically Erasable and Programmable ROM (EEPROM), an Erasable and Programmable ROM (EPROM), a register, a removable disk, and a web storage.

The projector 140 outputs the visual information (projected image) stored in the storage 130 to a projected position. The projector 140 is mechanically connected to an actuator configured for adjusting a tilt and rotation (roll, pitch, yaw) of the projector 140 to output the projected image to a desired projected position. The actuator operates under a control of the controller 170.

The monitoring means 150 monitors a status of the user, that is, the person viewing the exhibited vehicle. The monitoring means 150 includes a camera 151, a microphone 152, a memory 153, and a processor 154.

The camera 151 acquires an image of the user. The camera 151 may include at least one image sensor of sensors such as a CCD image sensor, a CMOS image sensor, a CPD image sensor, and a CID image sensor.

The microphone 152 receives an external acoustic signal from an outside through a vibration plate and converts the signal into electrical voice data (voice signal). A noise elimination algorithm for eliminating noise generated when the acoustic signal is received from the outside thereof may be implemented in the microphone 152.

The memory 154 may store a program for an operation of the processor 154 and temporarily store input/output data. The memory 153 stores image processing and analysis algorithms, sight-line recognition algorithms, and speech recognition algorithms.

The memory 153 may be embodied as at least one of a flash memory, a hard disk, a RAM, an SRAM, a ROM, an EEPROM, a PROM, a magnetic memory, a magnetic disk, and an optical disk.

The processor 154 controls overall operations of the monitoring means 150. The processor 154 may be embodied as at least one of an application specific integrated circuit (ASIC), a digital signal processor (DSP), a programmable logic device (PLD), a field programmable gate array (FPGA), a central processing unit (CPU), a microcontroller, and a microprocessor.

The processor 153 analyzes the user image acquired through the camera 151 to grasp the status of the user. In the present connection, the user's status includes information such as a sight line, a sighting duration, a sight line position, a head movement of the user and whether or not the user is accommodated in the vehicle.

The processor 154 analyzes a user's voice signal input through the microphone 152 using a voice recognition technology and converts the voice signal into a word or a sentence. The processor 154 recognizes the voice of the user and transmits the voice recognition result to the controller 170.

In the exemplary embodiment of the present invention, the monitoring means 150 for monitoring the status of the user using the camera 151 and/or the microphone 152 is separately implemented. However, the status of the user may be monitored using the image sensor and the auditory sensor provided in the sensor system 120 of the service robot 100.

The driving means 160 controls a movement of the service robot 100 according to an instruction from the controller 170. In other words, the driving means 160 includes an actuator for controlling the movement (travel) or rotation of the service robot 100.

The controller 170 controls the overall operation of the service robot 100. The controller 170 includes a processor and a memory (e.g., a ROM, a RAM, and an EEPROM) having a program programmed to allow the processor to perform a predetermined operation. The processor may be implemented as at least one of an ASIC, a DSP, a PLD, an FPGA, a CPU, a microcontroller, and a microprocessor.

The controller 170 may control an operation of the service robot 100 according to a control command transmitted from the outside thereof via the communication module 110. For example, when a user (guider) controls the service robot 100 through a controller disposed in a smartphone, the controller 170 receives a control command transmitted from the smartphone through the communication module 110, and controls the operation of the service robot 100 according to the received control command.

In one example, the controller 170 recognizes the voice command of the user through the sensor system 120 or the monitoring means 150 and controls the operation of the service robot 100 according to the recognized voice command. For example, controller 170 recognizes the user's voice command "Start a guide" through the microphone 152 of the monitoring means 150 and starts the guiding for the displayed vehicle.

The controller 170 may move the service robot 100 by controlling the driving means 160 based on travel path information stored in the storage 130. In other words, the controller 170 guides the viewing person to the target vehicle along a predetermined travel path. In one example, the controller 170 recognizes the travel line of the visitor through the monitoring means 150 and moves the service robot 100 according to the recognized travel line.

The controller 170 recognizes the target vehicle among displayed vehicles. The controller 170 reads the electronic tag or physical tag attached to the target vehicle to determine the location of the target vehicle. The controller 170 controls the driving means 160 to move the service robot 100 to the position of the target vehicle.

When the movement of the robot 100 to the target vehicle is completed, the controller 170 reads information related to the target vehicle from the storage 130 and presents the information to the visitor (user). The controller 170 may convert the information related to the vehicle information (target vehicle information) to a voice signal using a text to speech (TTS) application and output the voice signal through a speaker to the user. In the present connection, the target vehicle information may be stored as voice data. In the instant case, the controller 170 reproduces the target vehicle information as the voice data, and outputs the same to the speaker.

The controller 170 proposes a visual information service to the user (viewer) while describing the target vehicle based on the target vehicle information. In other words, when a visual additional presentation function is included in content describing the target vehicle, the controller 170 may suggest presenting a corresponding visual additional presentation to the user. For example, the controller 170 may suggest presenting to the user a corresponding visual additional presentation "Do you want to know a total width of the vehicle versus a width of a lane or a parking lot?" during describing the total width of the vehicle. In one example, the controller 170 may suggest presenting to the user a corresponding visual additional presentation "Would you want to see a case when an object is present in a blind spot of the vehicle?" during describing ADAS (Advanced driver-assistance systems).

The controller 170 waits for a response from the user (viewer) for a predetermined time after the visual presentation is suggested to the user. The controller 170 may receive the user's response via the monitoring means 150. To the present end, the controller 170 analyzes the user's sight-line or head movement through the monitoring means 150 to determine whether the user accepts the suggestion. Alternatively, the controller 170 recognizes a user's voice input through the microphone 152 of the monitoring means 150 and determines whether the user accepts the suggestion. In one example, the controller 170 may determine whether the user accepts the suggestion based on a user input through an input/output device, such as a touch screen.

The controller 170 projects (outputs) visual information according to whether the user accepts the suggestion. When the user does not accept the suggestion, the controller 180 starts presenting the target vehicle information without presenting to the user the visual additional presentation.

To the contrary, when the user accepts the suggestion, the controller 170 aligns the service robot 100 based on the target vehicle and adjusts the distance between the robot and the vehicle to secure a projection distance. The controller 170 may recognize position tags attached to the target vehicle and set an alignment-related reference point based on the position tags. The position tags may be attached to a front center, a rear center, two front tires and two rear tires of the vehicle, respectively. The position tags attached to the front center and rear center of the vehicle may act as an alignment reference point while the position tags attached to the front tires and the rear tires may act as an alignment adjustment reference point.

More specifically, followings will describe how to align the service robot 100 with the target vehicle.

The controller 170 identifies a center position of the target vehicle using the tag attached to the front center or rear center of the vehicle. The controller 170 aligns a center portion of the service robot 100 to the central position of the target vehicle in a straight line while the robot 100 is in front of the vehicle.

The controller 170 secures the projection distance necessary for projecting the visual information. The project distance is determined in advance based on the visual information.

The controller 170 rearranges the service robot 100 to the center portion of the target vehicle based on the position tags attached to the two front tires of the target vehicle or the two rear tires thereof and a vehicle specification database stored in the storage 130.

The controller 170 projects the visual information from the storage 130 onto the target vehicle when the alignment of the service robot 100 is completed. In the present connection, the visual information may be implemented as image data representing a parking lot defining line, a lane width, a lane, and the like.

Figure 3:
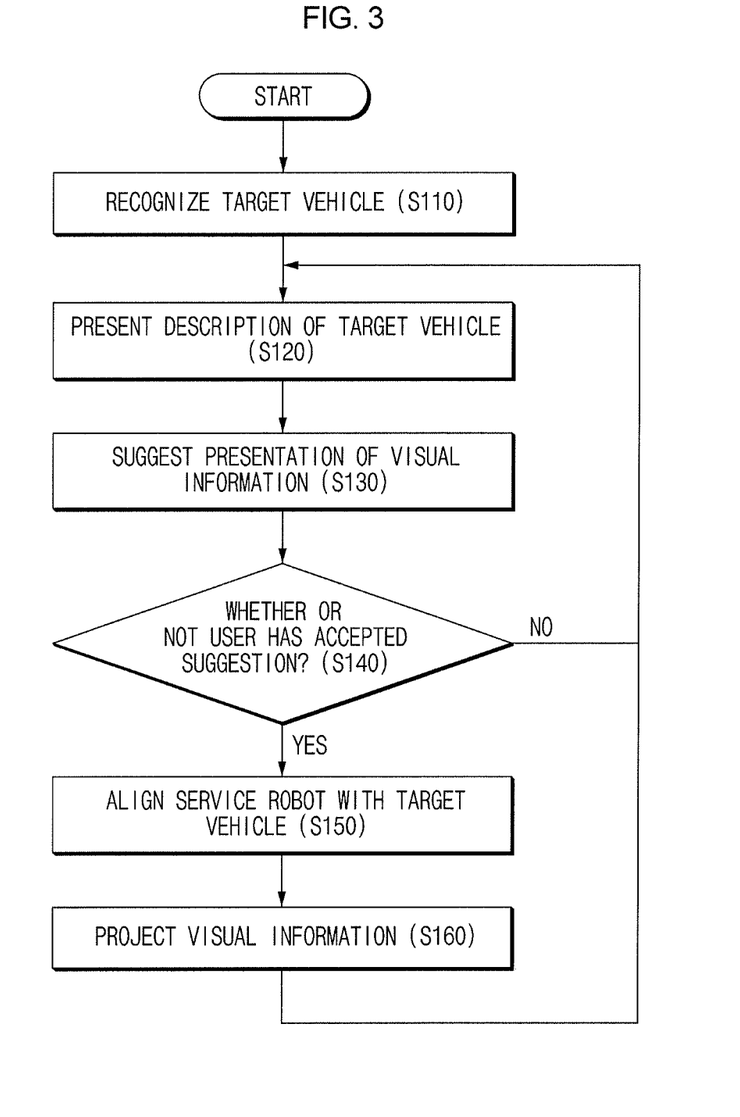
FIG. 3 is a flowchart showing a method of operating a service robot according to an exemplary embodiment of the present invention.

FIG. 3 is a flow chart showing a method for operating the service robot according to an exemplary embodiment of the present invention.

Referring to FIG. 3, the controller 170 of the service robot 100 recognizes the target vehicle to be described (S110). The controller 170 moves the service robot 100 to a location of the target vehicle and recognizes the electronic tag attached to the target vehicle. The electronic tags include identification information such as vehicle model information. Accordingly, the controller 170 may recognize the target vehicle to be described via the vehicle model information stored in the electronic tag.

The controller 170 outputs a description about the target vehicle (S120). To the present end, the controller 170 reads information related to the recognized target vehicle from the storage 130 and presents the vehicle description based on the read information. At the instant time, the controller 170 may output the vehicle description using a voice.

The controller 170 suggests presentation of the visual information service to the user (S130). The controller 170 may suggest the visual information service presentation to the user (visitor) when the description information related to the target vehicle description includes the additional visual information.

The controller 170 checks whether the user accepts the suggestion of the presentation of the additional visual information (S140). The controller 170 may check whether the user has accepted the suggestion via the monitoring means 150. For example, the service robot 100 may make presentation of the additional visual information "Would you want to know comparisons between a tire size of a vehicle A, vehicle B, or vehicle C and a tire size of the target vehicle" as contained in the description of the tire mounted on the vehicle. As such, in response thereto, the user may speak "Compare the tire size of the target vehicle with the tire size of the vehicle A". As such, the controller 170 of the service robot 100 may recognize the viewer's voice through the microphone 152 of the monitoring means 150.

As such, the controller 170 aligns the position of the service robot 100 with the target vehicle (S150). The controller 170 moves the service robot 100 by controlling the driving means 160 such that the center portion of the service robot 100 is aligned on a straight line to the center portion of the target vehicle in a longitudinal direction of the vehicle.

The controller 170 projects the visual information when the alignment of the service robot 100 is completed (S160). The controller 170 projects the visual information toward the target vehicle.

Figure 4:
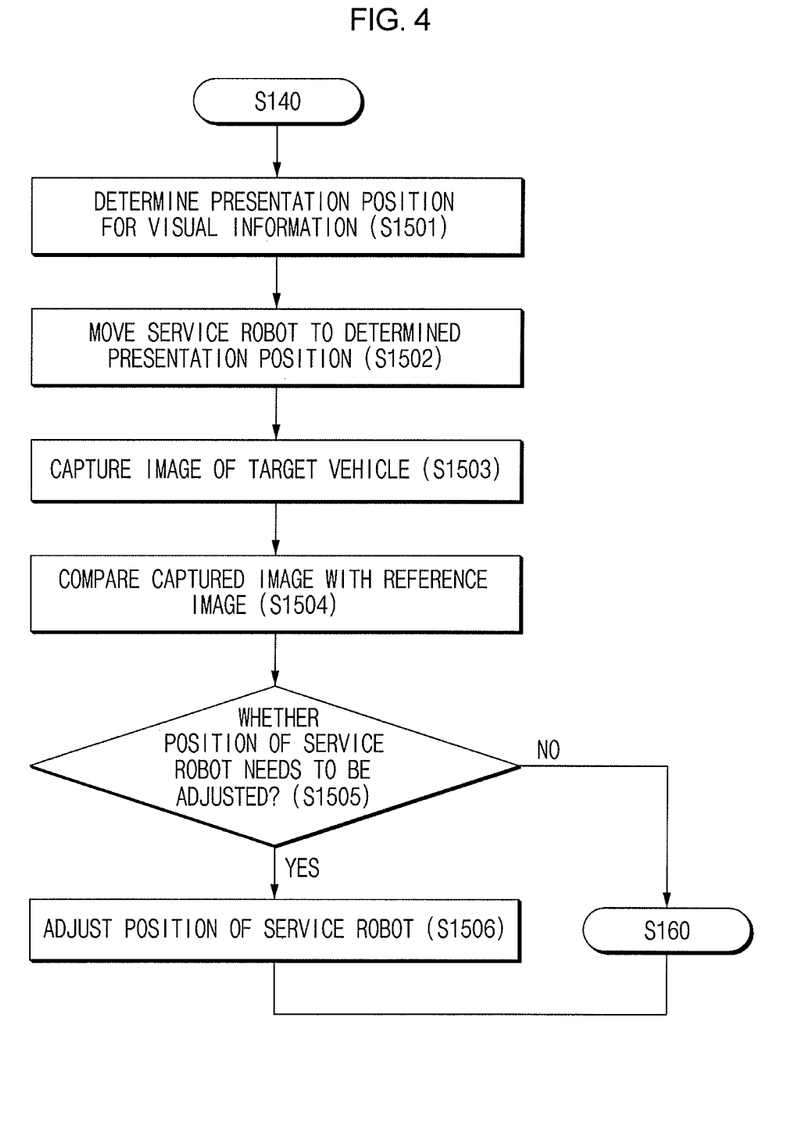
FIG. 4 illustrates one example of a process of aligning a service robot based on a target vehicle shown in FIG. 3.

FIG. 4 shows a process of aligning the position of the service robot with the target vehicle shown in FIG. 3. The present exemplary embodiment describes the alignment of a projection position from the service robot using four-directions vehicle silhouette information. In the present connection, the four-directions vehicle silhouette information includes lengths of the front, rear and both side sections of the vehicle, and tire positions of the vehicle. The present exemplary embodiment of the present invention may be applied in cases where accurate positions and sizes comparisons are required, such as comparisons in sizes (e.g., tire and vehicle widths) and shapes (e.g., appearance, sedan and hatch-back) between the target vehicle and other vehicle products.

When the user accepts the visual information presentation suggestion at S140, the controller 170 of the service robot 100 confirms a presentation position of the visual information (S1501). That is, the controller 170 identifies the vehicle section to be additionally described and then determines the presentation position by referring to information indicating an appropriate projection position for each vehicle section as stored in the storage 130.

The controller 170 controls the driving means 160 to move the service robot 100 to the presentation position (S1502).

The controller 170 captures an image of the target vehicle (S1503). The controller 170 captures an image of the vehicle section to be additionally described.

The controller 170 compares the captured image with a reference image (S1504). The controller 170 compares the captured image with an imaged included in the vehicle silhouette information stored in the storage 130. The controller 170 determines a similarity between the captured image and the image included in the vehicle silhouette information.

The controller 170 determines whether or not a position adjustment is required according to the comparison result (S1505). The controller 170 determines that the position adjustment is necessary when the similarity is smaller than 95%. The controller 170 determines that the position adjustment is unnecessary when the similarity is 95% or greater.

The controller 170 readjusts the position of the service robot 100 when the position adjustment is required (S1506).

The controller 170 further moves the service robot 100 with a predetermined distance from the current presentation position when the similarity is smaller than 75%. The controller 170 refines and redefines the presentation position when the similarity is greater than or equal to 75% and smaller than 95%.

The controller 170 projects the visual information to the vehicle section to be additionally described when the position adjustment of the service robot 100 is completed (S160).

Figure 5:
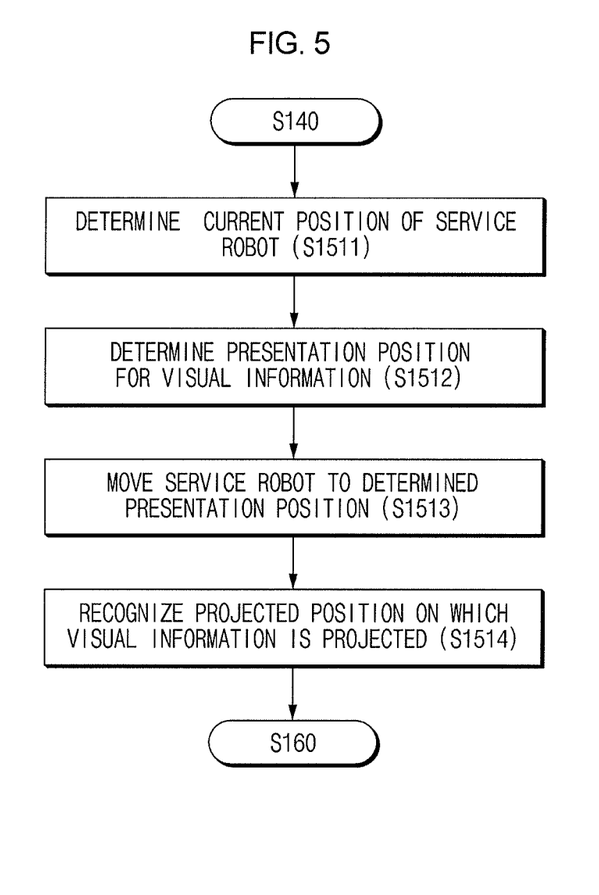
FIG. 5 shows another example of a process of aligning the service robot based on the target vehicle shown in FIG. 3.

FIG. 5 shows another example of the process of aligning the service robot with the target vehicle shown in FIG. 3. The present exemplary embodiment describes how to align the projection position of the service robot using the vehicle images information taken at 8-directions and 3-steps distances. The present exemplary embodiment of the present invention may be applied when it is necessary to point to an approximate position of each of various vehicle elements such as A/B pillars, head lamps, and the like.

When the controller 170 of the service robot 100 confirms the user' acceptance of the suggestion at S140, the controller 170 identifies the position of the service robot itself (S1511). The controller 170 analyzes the image acquired through the camera and locates the service robot itself. That is, the controller 170 identifies the relative position of the service robot 100 to the target vehicle.

The controller 170 confirms the presentation position for the visual information (S 1512). The controller 170 refers to information indicating the appropriate projection position for each vehicle section as stored in the storage 130 and identifies the presentation position corresponding to the vehicle section to be additionally described.

The controller 170 moves the service robot 100 to the presentation position (S 1513). The controller 170 controls the travel of the service robot 100 through the driving means 160 to move the service robot 100 to a position to or onto which the vehicle section to be additionally described points or projects.

The controller 170 recognizes the projected position (pointed position) of the target vehicle (S1514). The controller 170 recognizes the position where the visual information is to be pointed or is projected with taking into consideration the positions of the service robot 100 and the vehicle section to be additionally described.

The controller 170 outputs the visual information to recognized projected position which the visual information is pointed to (S160).

FIG. 6, FIG. 7, FIG. 8, FIG. 9 and FIG. 10 illustrate an example of projecting the visual information according to an exemplary embodiment of the present invention.

Figure 6:
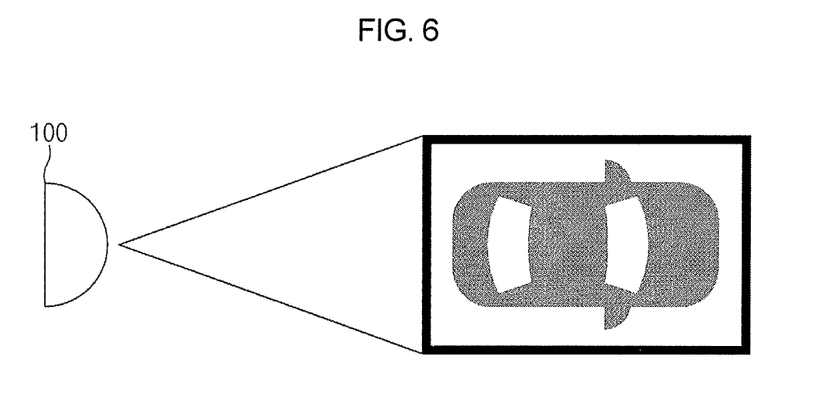
FIG. 6, FIG. 7, FIG. 8, FIG. 9 and FIG. 10 illustrate an example of projecting visual information according to an exemplary embodiment of the present invention.

Referring to FIG. 6, when the controller 170 indicates a comparison between a size of the parking space and the size of the vehicle in conjunction with the presentation of the total width of the vehicle, the controller 170 visually projects and displays a parking lot defining line around the target vehicle based on a parking lot line defining reference information pursuant to the Road Traffic Act.

In one example, when the controller 170 is presenting a vehicle size versus a lane width, the controller controls the projector 140 to visually display a lane around the target vehicle. In this regard, the controller 170 selects a display position indicating the lane by reflecting the lane width of the actual road.

Figure 7:
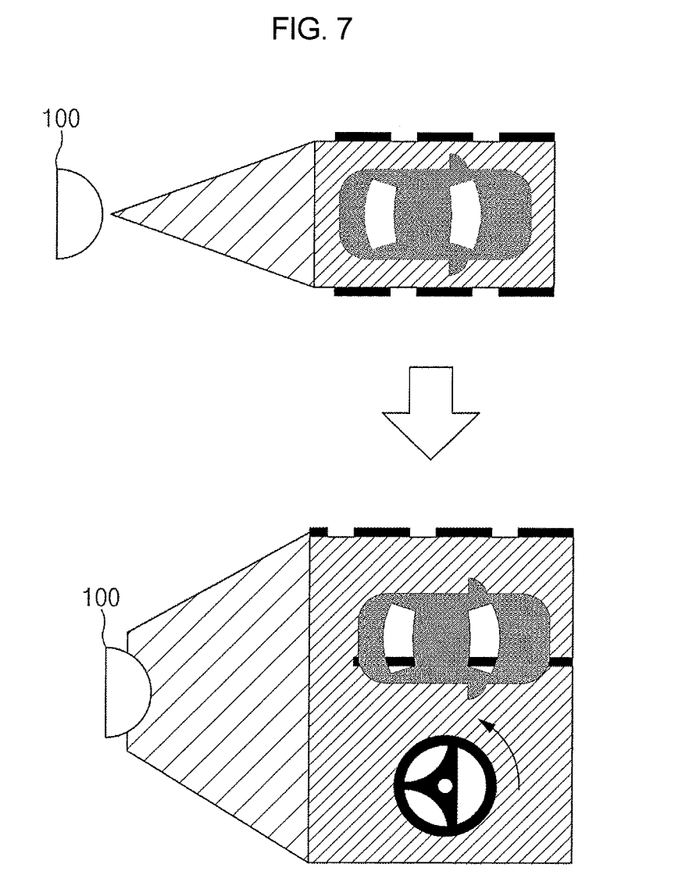

Next, when the controller presents a safety function of a vehicle such as LAKS and LDWS, the controller 170 projects a lane around the target vehicle as shown in FIG. 7 to present the corresponding safety function and/or how to operate the corresponding safety function. As such, the controller 170 outputs visual information on an operational state and an operation of the corresponding safety function, assisting the user.

Figure 8:
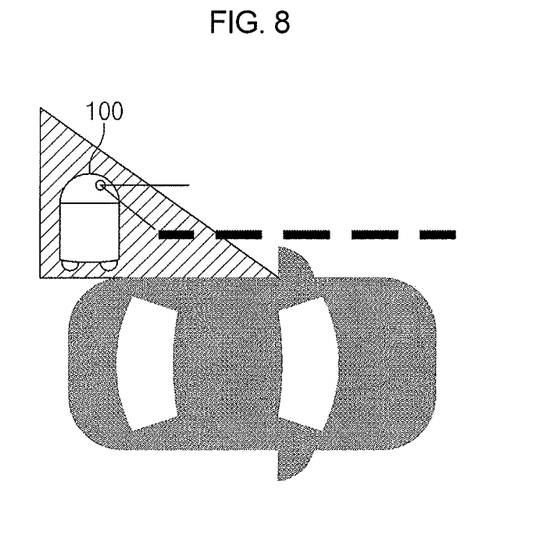

As shown in FIG. 8, the controller 170 may display a case when the robot 100 is located in the blind spot of the vehicle, and may demonstrate that a driver cannot see the service robot 100 in the blind spot via a projection of the lane.

Figure 9:
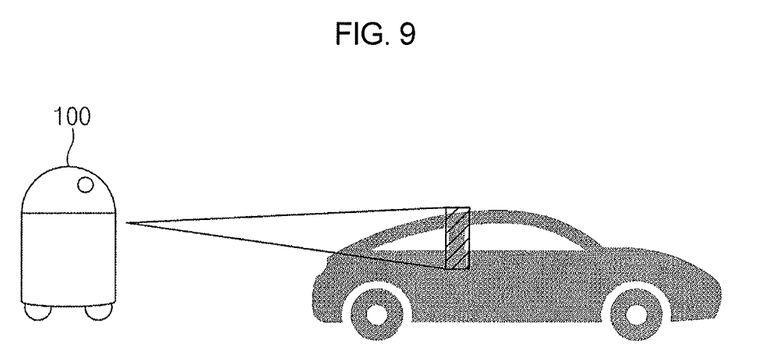

Referring to FIG. 9, when the service robot 100 describes a specific section of the vehicle, the section may be pointed to by projecting the visual information (for example, an arrow image) on the section. For example, when the service robot 100 presents a description "The vehicle has a thin B-pillar such that the vehicle looks slim", the controller 170 may point to a position corresponding to the B-pillar. Therefore, the viewer who does not know the term "B-pillar" can easily understand the vehicle section as presented by the service robot 100.

Figure 10:
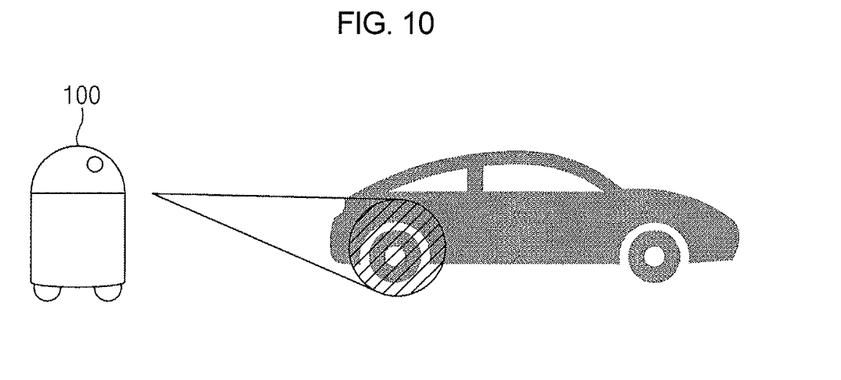

In one example, an appearance component such as a tire having various choices may be visually displayed in a compared manner. For example, as shown in FIG. 10, the service robot 100 projects a size of a comparative tire onto a tire of the target vehicle to be contrasted with the tire currently mounted on the target vehicle.

According to an exemplary embodiment of the present invention, when the robot is describing information related to the displayed vehicle, the surrounding environment as similar to the actual driving environment may be presented in a visual manner, such that the user understanding of the vehicle specification based on the actual driving environment may be improved.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A service robot comprising:
    a projector for projecting visual information related to a target vehicle;
    monitoring means for monitoring a state of a user; and
    a controller connected to the projector and the monitoring means and configured to:
        suggest, to the user, presentation of the visual information during guide description of the target vehicle;
        determine, via the monitoring means, when the user has accepted the suggestion of the presentation; and
        upon determination that the user has accepted the suggestion, present the visual information via the projector.

2. The service robot of claim 1, wherein the monitoring means includes:
    a sensor for detecting the user located within a predetermined radius from the target vehicle; and
    a processor connected to the sensor and configured for analyzing data detected at an output from the sensor and determining the state of the user.

3. The service robot of claim 2, wherein the sensor includes at least one of a camera and a microphone.

4. The service robot of claim 1, wherein the service robot further includes:
    a sensor system for detecting positions of the target vehicle and the service robot; and
    a communication module for performing wireless communication with the target vehicle.

5. The service robot of claim 4, wherein the controller is further configured to:
    acquire identification information related to the target vehicle through the communication module; and
    recognize the target vehicle based on the identification information.

6. The service robot of claim 4, wherein the controller is further configured to:
    determine the positions of the target vehicle and the service robot using the sensor system; and
    align a center portion of the service robot in a straight line with a center portion of the target vehicle.

7. The service robot of claim 4, wherein the controller is further configured to:
    determine a presentation position of the visual information with respect to pre-stored information indicating a predetermined presentation position corresponding to each vehicle section; and
    move the service robot to the determined presentation position.

8. The service robot of claim 7, wherein the controller is further configured to recognize a position onto which the projector is configured to project the visual information.

9. The service robot of claim 7, wherein the controller is further configured to:
    acquire an image of the target vehicle and compare the acquired image with a pre-stored reference image; and
    determine, based on a result of comparing the acquired image with the pre-stored reference image, when an adjustment of the position of the service robot is required.

10. The service robot of claim 9, wherein the controller is further configured to:
    when a similarity between the acquired image and the pre-stored reference image is lower than a threshold value, adjust the position of the service robot based on pre-stored vehicle silhouette information.

11. A method for operating a service robot, the method comprising:
    suggesting, by a controller, presentation of visual information to a user during guide description of a target vehicle;
    determining, by the controller, via a monitoring means when the user accepts the suggestion of the presentation of the visual information; and
    upon determination that the user accepts the suggestion, presenting, by the controller, the visual information via a projector.

12. The method of claim 11, wherein the performing of the guide description includes:

recognizing the target vehicle; and presenting a function and a manipulation of the target vehicle.

13. The method of claim 12, wherein the recognizing of the target vehicle includes recognizing tag information attached to the target vehicle using short-range wireless communication.

14. The method of claim 11, wherein the suggesting of the presentation of the visual information includes:

determining when an additional description is contained in content of the guide description; and upon determination that the additional description is contained in the content, suggesting the presentation of the visual information to the user.

15. The method of claim 14, wherein the additional description is presented visually.

16. The method of claim 11, wherein the determining when the user accepts the suggestion includes recognizing a voice of the user input through a microphone and determining, based on the voice, when the user accepts the suggestion of the visual information.

17. The method of claim 11, wherein the determining when the user accepts the suggestion includes monitoring a state of the user using a camera and determining, based on the state of the user, when the user accepts the suggestion.

18. The method of claim 11, wherein the presentation of the visual information includes:

aligning a position of the service robot to the target vehicle; and when the aligning of the position of the service robot to the target vehicle is completed, projecting the visual information.

19. The method of claim 18, wherein the aligning of the position of the service robot includes:

determining a current position of the service robot;

determining a presentation position for the visual information;

moving the service robot to the determined presentation position; and recognizing a position on which the visual information is configured to be projected.

20. The method of claim 18, wherein the aligning of the position of the service robot includes:

determining a presentation position for the visual information;

moving the service robot to the determined presentation position;

capturing an image of the target vehicle;

comparing the captured image with a reference image;

determining, based on a result of comparing the captured image with the reference image, when the position of the service robot needs to be adjusted; and upon determination that the position of the service robot needs to be adjusted, adjusting the position of the service robot.

* * * * *